United States Patent
Kim et al.

(10) Patent No.: US 10,792,805 B2
(45) Date of Patent: Oct. 6, 2020

(54) SEMI-HOLLOW ACTUATOR MODULE

(71) Applicant: ROBOTIS CO., LTD., Seoul (KR)

(72) Inventors: Byoung Soo Kim, Seoul (KR); Yong Jin Eum, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 0 days.

(21) Appl. No.: 16/472,241

(22) PCT Filed: Mar. 21, 2017

(86) PCT No.: PCT/KR2017/003024
§ 371 (c)(1),
(2) Date: Jun. 21, 2019

(87) PCT Pub. No.: WO2018/135698
PCT Pub. Date: Jul. 26, 2018

(65) Prior Publication Data
US 2019/0321966 A1  Oct. 24, 2019

(30) Foreign Application Priority Data

Jan. 18, 2017 (KR) .................... 10-2017-0008602

(51) Int. Cl.
*B25J 9/00* (2006.01)
*H02G 3/08* (2006.01)
*H02G 3/18* (2006.01)
*B25J 9/12* (2006.01)

(52) U.S. Cl.
CPC ............. *B25J 9/0009* (2013.01); *B25J 9/126* (2013.01); *H02G 3/081* (2013.01); *H02G 3/18* (2013.01)

(58) Field of Classification Search
CPC ...... B25J 9/0009; B25J 9/126; B25J 19/0025; B25J 19/0029; B25J 9/08; H02G 3/081; H02G 3/18
USPC .......................................................... 310/71
See application file for complete search history.

(56) References Cited

U.S. PATENT DOCUMENTS

| | | | | |
|---|---|---|---|---|
| 5,313,129 A * | 5/1994 | Stewart | ................ | H02K 5/1672 310/71 |
| 5,625,244 A * | 4/1997 | Bradfield | ............. | H02K 13/003 310/232 |
| 5,704,100 A * | 1/1998 | Swan | ..................... | F16B 21/186 24/546 |
| 2010/0163261 A1 * | 7/2010 | Tomayko | ............... | B23B 45/008 173/47 |

(Continued)

FOREIGN PATENT DOCUMENTS

| | | | | |
|---|---|---|---|---|
| JP | 10141340 A | * | 5/1998 | ............ F16B 21/186 |
| KR | 10-0749540 B1 | | 8/2007 | |

(Continued)

OTHER PUBLICATIONS

Translation of foreign document KR 20100123176 A (Year: 2010).*

*Primary Examiner* — Alex W Mok
(74) *Attorney, Agent, or Firm* — Novick, Kim & Lee, PLLC; Jae Youn Kim; Jihun Kim

(57) ABSTRACT

The present invention relates to a semi-hollow actuator module and, more particularly, to a semi-hollow actuator module that has solved the problem that wires (cables) are entangled when an actuator module including a motor and a reducer therein is combined with another actuator module or a module connection member, etc. by improving a connection structure of the wires.

9 Claims, 9 Drawing Sheets

(56) References Cited

U.S. PATENT DOCUMENTS

| | | | |
|---|---|---|---|
| 2011/0241484 A1* | 10/2011 | Okada | H02N 2/105 |
| | | | 310/323.02 |
| 2011/0298343 A1* | 12/2011 | Kim | H05K 5/0008 |
| | | | 312/223.6 |
| 2012/0312259 A1* | 12/2012 | Yamanaka | F01L 1/352 |
| | | | 123/90.15 |
| 2013/0040774 A1* | 2/2013 | An | B62M 6/65 |
| | | | 475/149 |
| 2013/0221641 A1* | 8/2013 | Kondo | B60R 21/2037 |
| | | | 280/731 |
| 2013/0324345 A1* | 12/2013 | Asakura | B62D 5/008 |
| | | | 475/198 |
| 2014/0298939 A1* | 10/2014 | Kim | B25J 9/1025 |
| | | | 74/411.5 |
| 2014/0353068 A1* | 12/2014 | Yamamoto | B62D 5/0412 |
| | | | 180/444 |

FOREIGN PATENT DOCUMENTS

| | | | | | |
|---|---|---|---|---|---|
| KR | 10-2010-0123175 A | | 11/2010 | | |
| KR | 10-2010-0123176 A | | 11/2010 | | |
| KR | 101115067 B1 | * | 2/2012 | | |
| KR | 101225139 B1 | * | 1/2013 | | |
| KR | 20130018402 A | * | 2/2013 | | |
| KR | 20130045693 A | * | 5/2013 | | F16H 37/041 |
| KR | 101352388 B1 | * | 1/2014 | | F16H 35/00 |
| KR | 10-1384095 B1 | | 4/2014 | | |
| KR | 10-2017-0004709 A | | 1/2017 | | |

\* cited by examiner

SEMI-HOLLOW ACTUATOR MODULE

TECHNICAL FIELD

The present invention relates to a semi-hollow actuator module and, more particularly, to a semi-hollow actuator module that has solved the problem that wires (cables) are entangled when an actuator module including a motor and a reducer therein is combined with another actuator module or a module connection member, etc. by improving a connection structure of the wires.

BACKGROUND ART

An actuator module usually includes a driving device (motor) and a reducer therein and is widely used not only for a common industry, but for home and education. In particular, actuator modules are recently more spotlighted in that a multi-joint robot that can perform complicated motions can be achieved by combining several actuator modules.

FIG. 1 is an actual photograph of a humanoid type multi-joint robot achieved by repeatedly combining several standardized actuator modules and connection members of the modules (see Patent Document 1). In this robot, each actuator module should be controlled in accordance with predetermined regulations, and to this end, wires for transmitting power and signals should be connected to all of the actuator modules.

FIG. 2 shows an assembly of an actuator module (lower one) and a module connection member (upper one). In order to combine several actuator modules, it is necessary to connect the actuator modules to module connection members with driving shafts of the actuator modules as center. Further, as combination structures of several actuator modules and module connection members are repeated, the type shown in FIG. 1 or various types of robots that manufacturers want can be manufactured.

It is important to deal with wires when connecting an actuator module to a module connection member or another actuator module. In particular, several wires for controlling and sensing are required to control several actuator modules with a central processing unit or a central controller, and these wires should be dealt with not to interfere with driving of the actuator modules. Further, when wires are complicatedly entangled, it is not good even for the external appearance.

In particular, the more the actuator modules constituting a robot, the more difficult it is to deal with the wires, so there may be a problem that the driving range of the actuators is limited or the structure of the robot cannot be simplified.

In the actuator modules shown in FIGS. 1 and 2, protrusive structures having through-holes through which wires can pass are installed on sides of a housing that forms the outer frame of the actuator module. However, the driving range (rotation range) of the actuator module may be still limited even in this case using these structures. Further, the protrusive structures themselves may act as obstacles when they connect several actuator modules. Further, the external appearance may give an impression that is not neat. It can be seen in the humanoid type robot shown in FIG. 1 that the wires connected to the outside from the arms or legs may interfere with driving of the robot.

The problem with dealing with wires of actuator modules was stated above by exemplifying a robot for home or education, but this problem is an inevitable problem of all actuator modules even though there is a large or small difference. Accordingly, there is a need for a module structure improved to solve the problem with dealing with wires in actuator modules.

SUMMARY OF INVENTION

Technical Problem

An object of the present invention is to provide a new module structure that can solve the problem with dealing with wires in actuator modules.

The objects to implement in the present invention are not limited to the technical problems described above and other objects that are not stated herein will be clearly understood by those skilled in the art from the following specifications.

Solution to Problem

In order to achieve the objects, an embodiment of the present invention provides a semi-hollow actuator module.

In an embodiment of the present invention, a semi-hollow actuator module including a motor, a reducer, and a control circuit includes: a first housing, being coupled to an active shaft configured to be inserted into the first housing, wherein the active shaft is connected to the motor; and a second housing, being coupled to the first housing, being coupled to an idler assembly, wherein the idler assembly and the active shaft are configured to be located coaxially, in which the idler assembly includes: a passive idler, being disc-shaped and having a hole therein; and a coupling member, having a through-groove at an outer circumferential surface thereof and rotatably coupling the idler to the second housing, wherein the through-groove is recessed toward a center of the coupling member, and wherein a cable is configured to be connected to an inside of the second housing through the hole and the through-groove.

In an embodiment of the present invention, the coupling member may be inserted in the hole of the idler and combined with the second housing.

In an embodiment of the present invention, the second housing may have a moving groove recessed inward at a position corresponding to the through-groove, and the cable may be connected to the inside of the second housing through the moving groove.

In an embodiment of the present invention, the idler may have: a disc having a coupling hole and having a hole therein; and a locking protrusion vertically being extended at an inner circumferential surface of the disc, and the coupling member may have: a cylindrical body having a longitudinally formed hole, being coupled to the second housing, and having the through-groove; and an anti-separation step being vertically extended from an end of the cylindrical body except for the area where the through-groove is formed.

In an embodiment of the present invention, a terminal that can be connected with a connector at an end of the cable may be formed at a side surface of the first housing.

In an embodiment of the present invention, a through-portion may be formed at a side surface of the second housing and the cable connected to the terminal may be connected to the inside of the second housing through the through-portion.

In an embodiment of the present invention, the terminal may be disposed on each of both sides of the first housing.

In an embodiment of the present invention, the second housing may have: an upper end portion to which the coupling member is coupled; a lower end portion being formed with the same height as the upper end portion; and an upper-lower end connecting portion being disposed between the upper end portion and the lower end portion and recessed inward.

In an embodiment of the present invention, the upper end portion may have a seat being recessed inward at a position where the idler assembly is seated.

In an embodiment of the present invention, the actuator module may further include a cover being coupled to the upper-lower end connecting portion and having side protrusions preventing separation of the connector at the end of the cable connected to the terminal.

In an embodiment of the present invention, the shaft and the idler may be coaxially disposed.

Advantageous Effects of Invention

According to an embodiment of the present invention, a new module structure that can solve the problem with dealing with wires of an actuator module can be provided. By this actuator module structure, the problem of twisting or disconnecting of wires is prevented and problems of communication failure are also reduced. Further, aesthetic feeling of the external appearance of an actuator module can be improved. This effect becomes more useful particularly when manufacturing a multi-joint robot by repeatedly combining several actuator modules.

The effects of the present invention are not limited thereto and it should be understood that the effects include all effects that can be inferred from the configuration of the present invention described in the following specification or claims.

DESCRIPTION OF EMBODIMENTS

Figure 1:
FIG. 1 a photograph of a humanoid type multi-joint robot using actuator modules in the related art.
Figure 2:
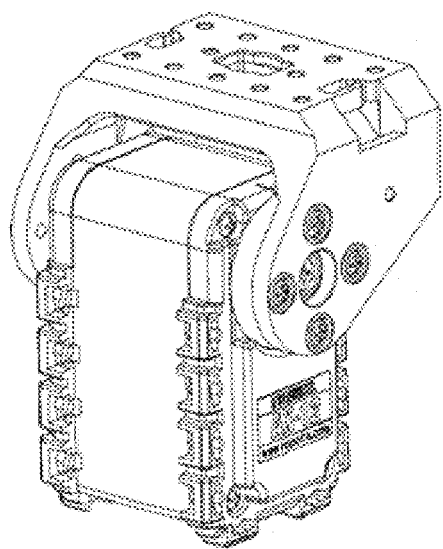
FIG. 2 is a view showing an assembly of an actuator module and a module connection member in the related art.

Hereinafter, the present invention is described with reference to the accompanying drawings. However, the present invention may be modified in various different ways and is not limited to the embodiments described herein. Further, in the accompanying drawings, components irrelevant to the description will be omitted in order to obviously describe the present invention, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present invention are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments are described in detail with reference to the accompanying drawings.

Figure 3:
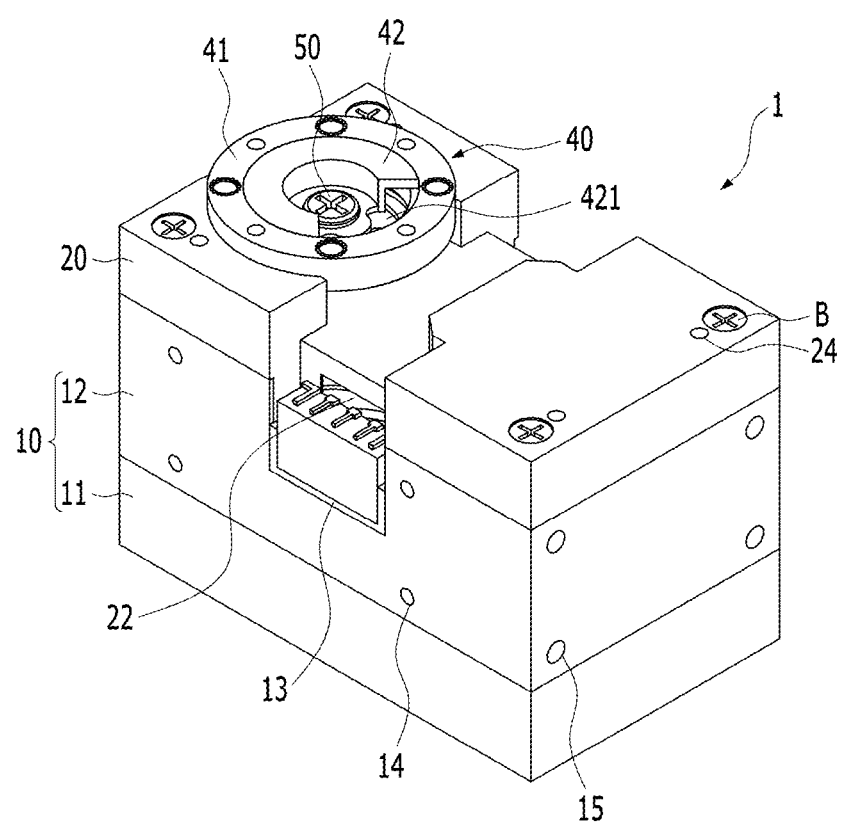
FIG. 3 is a perspective view of a semi-hollow actuator module according to an embodiment of the present invention.
Figure 4:
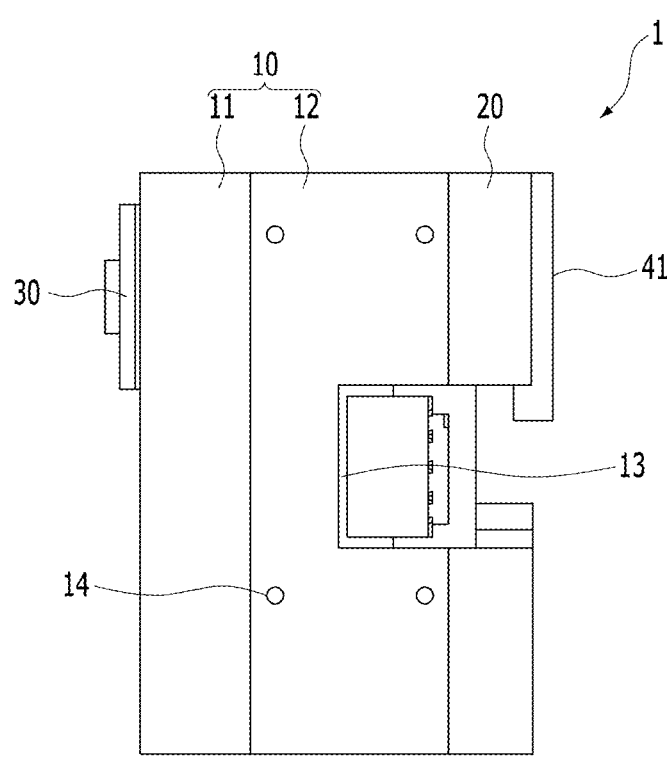
FIG. 4 is a side view of the semi-hollow actuator module according to an embodiment of the present invention.

FIG. 3 is a perspective view of a semi-hollow actuator module 1 according to an embodiment of the present invention, and FIG. 4 is a side view of the semi-hollow actuator module 1 according to an embodiment of the present invention.

The semi-hollow actuator module 1 according to an embodiment of the present invention includes a first housing 10 and a second housing 20.

An actuator is a device that operates a machine or an apparatus using power and is usually implemented using an electric motor. The semi-hollow actuator module 1 includes a motor that is a driving unit, a reducer, and a control circuit for the motor and the reducer therein.

The first housing 10 and the second housing 20 may be, in combination, referred to as a housing. The housing is a component that forms an outer frame or an outer structure of the semi-hollow actuator module 1 and protects the motor, the reducer, and the control circuit therein. A structure for directly coupling to another actuator or coupling to a module connection member for connection with another actuator may be formed at the housing. Another actuator module may be the semi-hollow actuator module 1 of the present invention or may be another type of actuator module.

An active shaft 30 connected to the motor (not shown) may be inserted through and coupled to the first housing (see FIG. 4). That is, a shaft 30 that receives driving force through the motor in the semi-hollow actuator module 1 is installed at a side of the first housing 10. A structure that can be connected to an external member, for example, a coupling groove or horn may be integrally or separably disposed at the shaft 30. The reducer may be disposed between the actuator motor and the shaft 30.

The first housing 10 may be integrally formed, or may be a separable sub-housing. For example, as shown in the figures, the first housing 10 may include a first sub-housing 11 and a second sub-housing 12. For example, the reducer may be disposed in the first sub-hosing 11 and the motor may be disposed in the second sub-housing 12. Further, by the separable structure of the first housing 10, it is possible to more efficiently divide the internal space and facilitate assembly and disassembly.

A terminal 13 may be disposed at a side of the first housing 10. Cables 100 may be electrically connected to the terminal 13 (see FIG. 6). Accordingly, it is possible to supply a current to the motor in the semi-hollow actuator module 1 or transmit/receive electrical signal to/from the control circuit in the semi-hollow actuator module 1 through the cables 100 and the terminal 13. The signals that are transmitted/received may be control signals for driving the motor or sensing signals from sensors in the semi-hollow actuator module 1. A connector 110 may be disposed at ends of the cables 100 and may be coupled to the terminal 13 (see FIG. 6).

The terminal 13 may be disposed on each of both sides of the first housing 10, and in this case, it may be possible to use only the terminal 13 on any one side, depending on convenience for wire connection.

Further, first coupling grooves 14 and 15 for coupling to another actuator module or a module connection member may be formed at one or more of the outer sides of the first housing 10, that is, the sides, top surface, and bottom surface of the first housing 10. A female thread may be formed at inner circumferential surfaces of the first coupling grooves 14 and 15. As shown in the figures, the outer sides of the first housing 10 and the second housing may be flat surfaces and can be screwed (bolted) to another actuator module or a module connection member by the first coupling grooves 14 and 15.

The second housing 20 is coupled to the first housing 10. The second housing 20 may be coupled to the other side of the first housing 10, that is, the opposite side to the side through which the shaft 30 is installed. The first housing 10 and the second housing 20 may be combined by bolts B. The bolts B can be inserted into a plurality of bolt holes formed at a side of the second housing 20 and then thread-fastened to the female threads at the inner side of the first housing 10. In order to combine the first housing 10 and the second housing 20, any other methods, for example, fitting that uses a prominence and recession structure, another structural method, and a bonding method may be used.

The second housing 20 may have a seat 21 formed at a position corresponding to the active shaft 30 (see FIG. 5), and an idler assembly 40 may be seated in the seat 21. The seat 21 is formed in the same shape as the idler assembly 40, thereby being able to prevent separation of the idler assembly 40.

The idler assembly 40 includes a passive idler 41 and a coupling member 42 being rotatably coupled to the second housing 20. The idler 41 is formed in a shape of a disc and has a hole 413 at the center (see FIG. 5). The hole 413 may be formed in a shape of a semi-hole. The coupling member 42 is inserted in the hole 413 of the idler 41 and may be coupled to the second housing 20. The coupling member 42 and the second housing 20 can be combined by inserting a bolt 50 in a hole 424 formed at a center of the coupling member 20 and then thread-fastening the bolt 50 to the female thread formed at an inner side of the second housing 20. The maximum diameter of the coupling member 42 is greater than the maximum diameter of the hole 413 of the idler 41, so the idler 41 can be rotatably disposed on the second housing 20 by the coupling member 42 being inserted in the hole 413 of the idler 41 and coupled to the second housing 20.

That is, the seat 21 may be formed coaxially with the active shaft 30 at a side of the second housing 20 and the idler 41 may be rotatably disposed in the seat 21.

The idler 41 does not receive driving force from the motor in the semi-hollow actuator module 1 and only supports another member when the active shaft 30 transmits driving force to the member.

Figure 7:
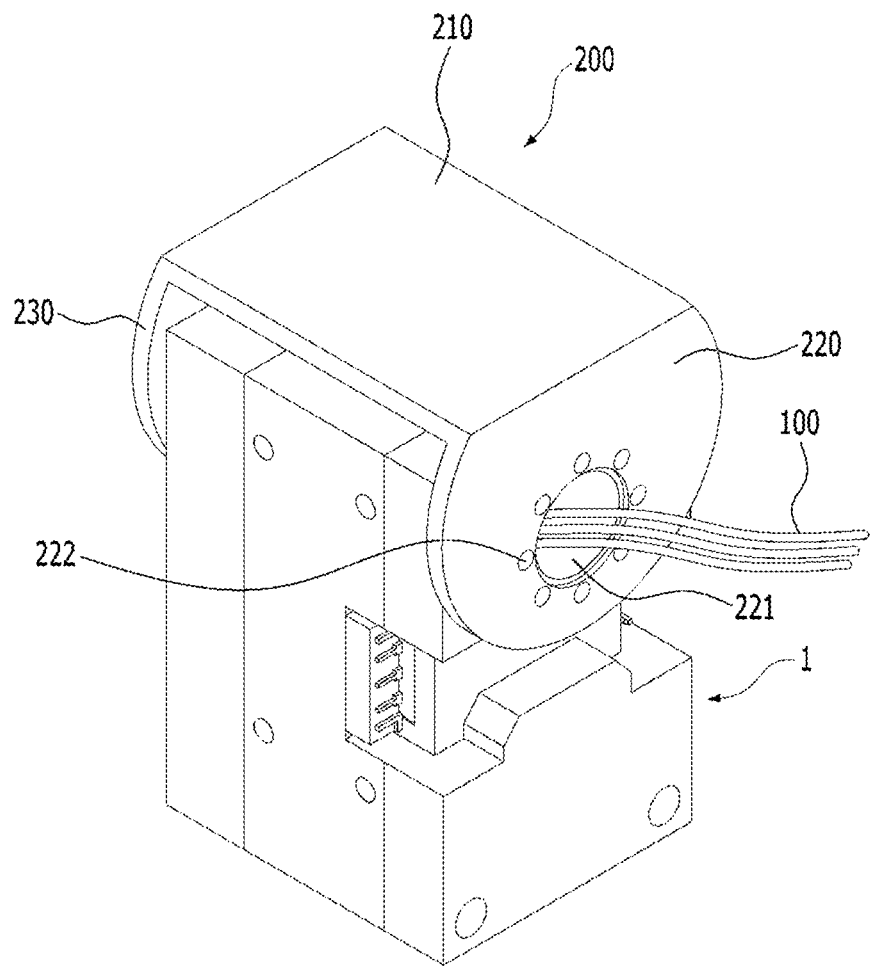
FIG. 7 is a perspective view showing an assembly of a module connection member and the semi-hollow actuator module according to an embodiment of the present invention.

Referring to FIG. 7, when semi-hollow actuator module 1 is connected with another member, that is, the module connection member 20, the idler 41 supports the module connection member 20, which will be described in detail below.

A through-portion 22 may be formed at a side of the second housing 20. The cables 100 being connected to the terminal 13 can be connected to the inside of the second housing 20 through the through-portion 22. When the through-portion 22 is not used, foreign substances may enter the housing through the through-portion 22, so a cover (not shown) that covers the through-portion 22 may be disposed at the through-portion 22. Further, the through-portion 22 may be formed by removing the cover from the second housing 20.

A second coupling groove 24 may be formed at a front side of the second housing 20. The second coupling groove 24, similar to the first coupling grooves 14 and 15, is provided for coupling to another actuator module or a module connection member. Further, a female thread may be formed at an inner circumferential side of the second coupling groove 24.

Figure 5:
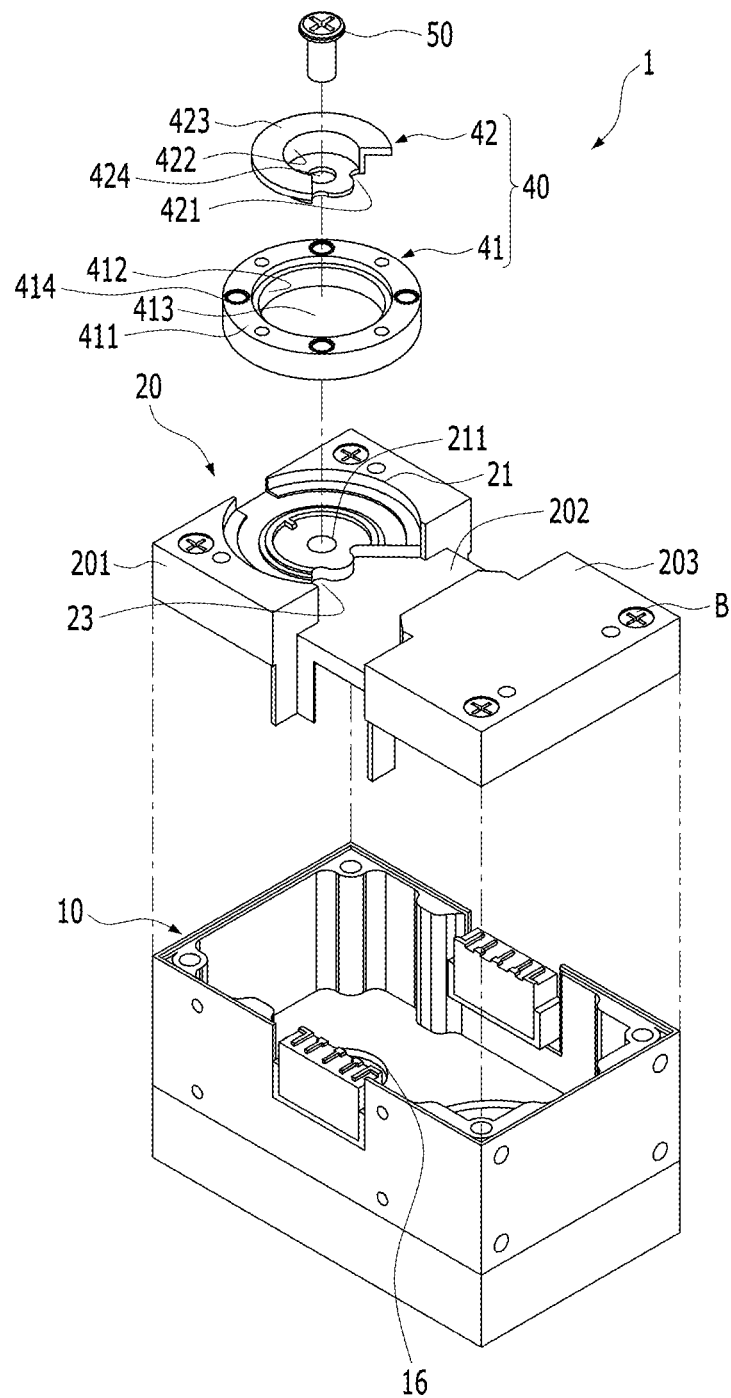
FIG. 5 is an exploded perspective view of the semi-hollow actuator module according to an embodiment of the present invention.
Figure 6:
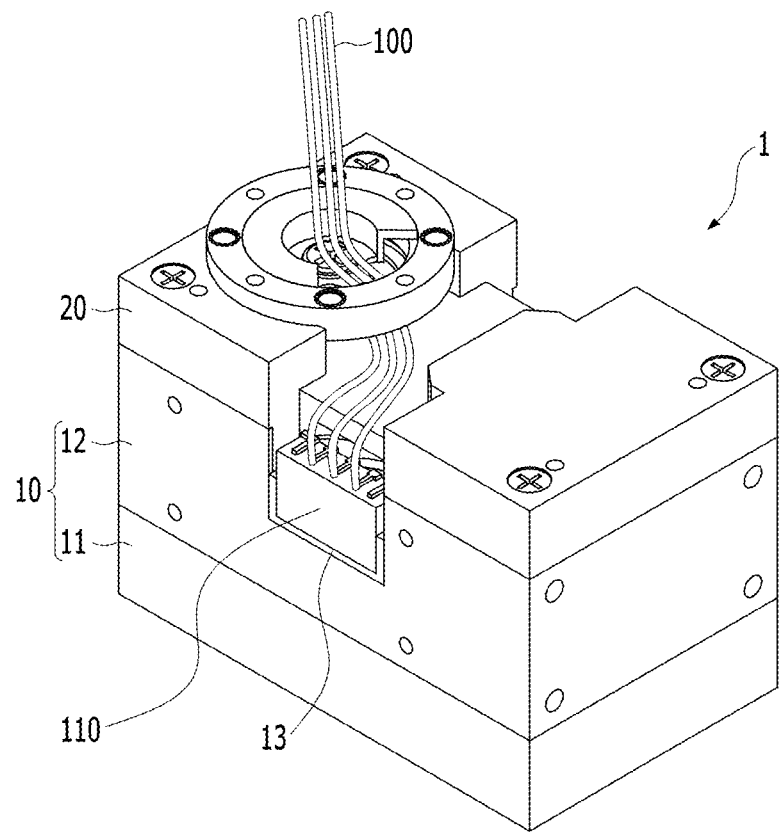
FIG. 6 is a perspective view when cables are connected to the semi-hollow actuator module according to an embodiment of the present invention.

FIG. 5 is an exploded perspective view of the semi-hollow actuator module 1 according to an embodiment of the present invention, and FIG. 6 is a perspective view when the cables 100 are connected to the semi-hollow actuator module 1 according to an embodiment of the present invention.

As shown in the figures, a first hole 16 for installing the active shaft 30 is formed at the first housing 10 and the seat 21 for installing the idler assembly 40 is formed at the second housing 20 at the position corresponding to the first hole 16 of the first housing 10. Accordingly, the active shaft 30 and the idler 41 can be coaxially disposed.

The idler 41 has a disc 411 having the hole 413 at the center and a locking protrusion 412 being vertically extended at an inner circumferential side of the disc 411. Coupling holes 414 may be formed at the disc 411. Another actuator module or a module connection member can be fixed to the coupling holes 414.

The coupling member 42 includes a cylindrical body 422 having a longitudinally formed hole 424 and a through-groove 421 being recessed toward the center at an outer circumferential surface, and an anti-separation step 423 being vertically extended from an end of the cylindrical body 422 except for the area where the through-groove 421 is formed. As the coupling member 42 is not rotated with rotation of the idler 41, the cables 100 disposed through the through-groove 421 are not influenced by rotation of the idler 41.

An idler assembly coupling groove 211 may be formed in the seat 21, and a female thread may be formed at the inner circumferential side of the idler assembly coupling groove 211. Accordingly, the coupling member 42 can be coupled to the idler assembly coupling groove 211 by the bolt 50.

The second housing 20 may have a moving groove 23 formed at a position corresponding to the through-groove 421. The moving groove 23, which is a groove for guiding the cables 100 passing through the through-groove 421, may be formed in the same shape as the through-groove 421. The cables 100 are connected to the inside of the second housing 20 through the through-groove 412 and the moving groove 23, so even if the idler 41 is rotated, the cables 100 are not rotated with the idler 41, whereby the cables 100 are not twisted.

The second housing 20 has an upper end portion 201, a lower end portion 203, and an upper-lower end connecting portion 202 being disposed between the upper and lower end portions. The seat 21 to which the idler assembly 40 can be coupled and the moving groove 23 through which the cables 100 can be moved may be formed at the front side of the upper end portion 201, and the lower end portion 203 may be formed with substantially the same height as the upper end portion 201. The upper-lower end connecting portion 202 is positioned between the upper end portion 201 and the lower end portion 203, and may be recessed inward. In accordance with an embodiment of the present invention, a cover 60 may be coupled to the upper-lower end connecting portion 202. This will be described below with reference to FIG. 8.

The cables 100 connected to the inside of the housing through the through-groove 421 of the coupling member 42 and the moving groove 23 of the second housing 20 can be electrically connected with the terminal 13 of the first housing 10 through the through-portion 22 formed at a side of the second housing 20. That is, the connector 110 at ends of the cables 100 can be coupled to the terminal 13, and this structure for coupling a connector is well known, so it is not described in detail.

When the cables 100 are connected to the inside of the housing through the through-groove 421 and the moving groove 23, the cables 100 do not influence rotation of the idler 41, so disconnection is prevented and twisting of the cables 100 is also prevented. That is, it is possible to effectively connect wires to the outer side of the housing through the wire (cable) connection structure of the present invention.

FIG. 7 is a perspective view when a module connection member 200 is connected to the semi-hollow actuator module 1 according to an embodiment of the present invention.

The module connection member 200 may have a body part 210, and a first vertical part 220 and a second vertical part 230 being vertically formed at both sides of the body portion 210. The first vertical part 220 may have a second hole 221 and thread holes 222 formed around the second hole 221. The thread holes 222 and the coupling holes 414 of the idler 41 can be coupled by bolts. Though not shown in FIG. 7, the second vertical part 230 may have a hole and thread holes, similar to the first vertical part 220, and may be coupled to the active shaft 30.

Even in the case where the semi-hollow actuator module 1 is combined with the module connection member 200, the cables 100 can be connected to the inside of the semi-hollow actuator module 1 through the through-groove 421 of the coupling member 42 and the second hole 221 of the module connection member 200. Accordingly, even though the semi-hollow actuator module 1 is driven and the module connection member 200 is correspondingly rotated, the cables 100 are not twisted. Further, rotation of the module connection member 200 is not interfered by the cables 100. After the cables 100 are connected, the cover 60 can be coupled such that the cables 100 are not easily pulled out and are arranged in terms of external appearance.

Figure 8:
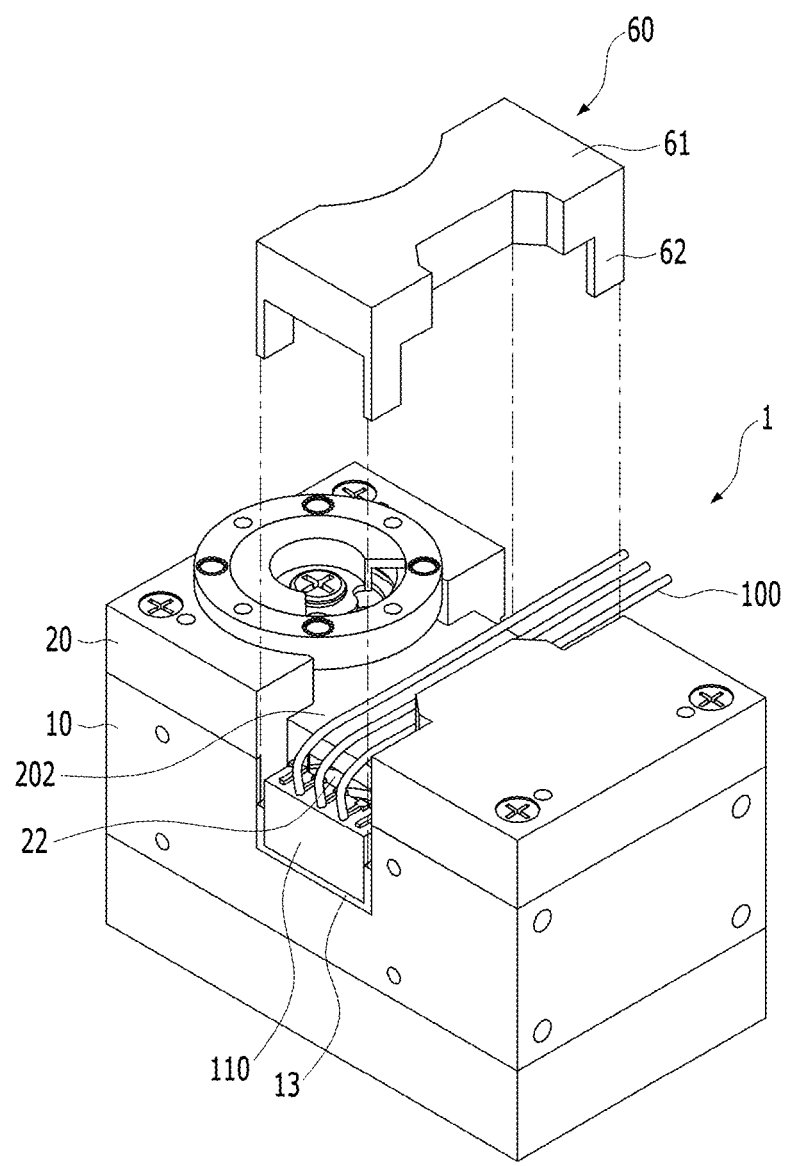
FIG. 8 is an exploded perspective view of a cover and the semi-hollow actuator module according to an embodiment of the present invention.
Figure 9:
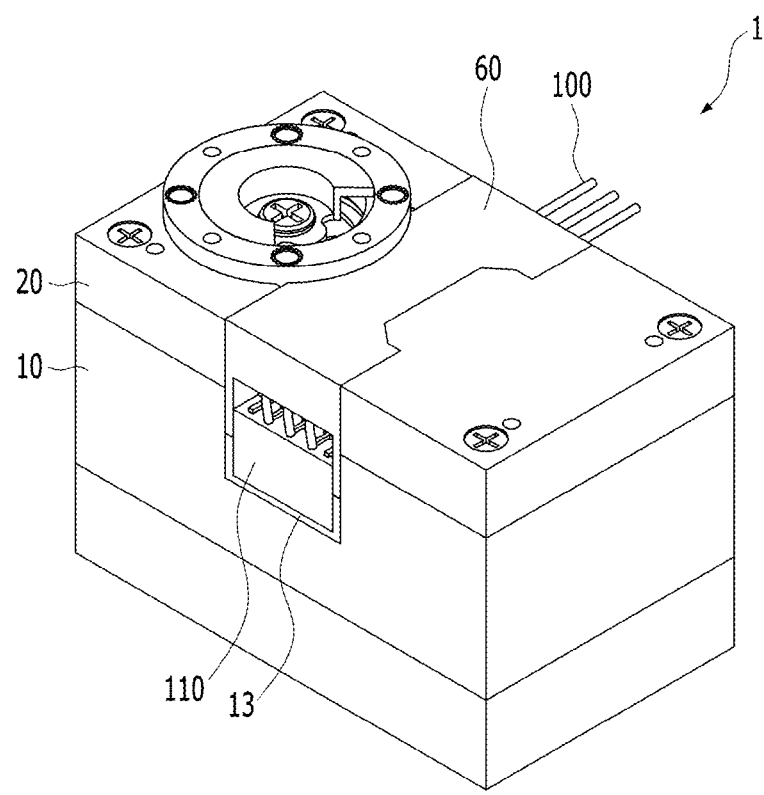
FIG. 9 is a perspective view of an assembly of the cover and the semi-hollow actuator module according to an embodiment of the present invention.

FIG. 8 is an exploded perspective view when the cover 60 is connected to the semi-hollow actuator module 1 according to an embodiment of the present invention, and FIG. 9 is a perspective view when the cover 60 is connected to the semi-hollow actuator module 1 according to an embodiment of the present invention.

As shown in the figures, the cover 60 is coupled around the upper-lower end connecting portion 202 of the second housing 20, thereby forming a portion of the outer side of the second housing 20. The cover 60 has a rectangular cover body 61 and side protrusions 62 being vertically protruded from corners of the cover body 61. The protrusions 62 can be fitted in a space between the connector 110 and the second housing.

When the cover 60 is coupled to the second housing 20, the side protrusions 62 of the cover 60 are in contact with the connector 110 at the ends of the cables 100 being connected to the terminal 13, whereby the connector 110 can be prevented from being separated from the terminal 13. Further, when the semi-hollow actuator module 1 is combined with the cover 60, the inside of the housing is completely isolated from the outside, so a malfunction due to foreign substances entering the housing can be prevented.

The cables 100 being connected to the terminal 13 can be connected to the outside through the moving groove 23 of the second housing 20 and the through-groove 421 of the coupling member 42, and, as shown in FIGS. 8 and 9, can be connected to the outside through inner side of the cover 60. By the housing structure of the semi-hollow actuator module 1 according to the present invention, a user can connect wires of the semi-hollow actuator module 1 to the inside of the housing through the idler assembly 40 and the through-portion 22 of the second housing 20. Accordingly, the problem of twisting or disconnection of wires can be prevented, problems of communication failure can be reduced, and the aesthetic feeling of the external appearance of the semi-hollow actuator module 1 can be improved. In particular, when a multi-joint robot is manufactured by coupling other actuator modules or module connection members 200 to the semi-hollow actuator module 1, freedom of design can be increased and actuators can be more smoothly driven by dealing with wires, as described above.

The above description is provided as an exemplary embodiment of the present invention and it should be understood that the present invention may be easily modified in other various ways without changing the spirit or the necessary features of the present invention by those skilled in the art. Therefore, the embodiments described above are only examples and should not be construed as being limitative in all respects. For example, the components described as a single part may be divided and the components described as separate parts may be integrated.

The scope of the present invention is defined by the following claims, and all of changes and modifications obtained from the meaning and range of claims and equivalent concepts should be construed as being included in the scope of the present invention.

EMBODIMENTS

The embodiments of the present invention have been described together in the best mode for carrying out the disclosure.

INDUSTRIAL APPLICABILITY

According to the semi-hollow actuator module of the present invention, a new module structure that can solve the problem of dealing with wires of an actuator module, whereby the problem of twisting or disconnection of wires is prevented and problems of communication failure is also reduced.

What is claimed is:

1. A semi-hollow actuator module, comprising:
a motor;
a first housing, being coupled to an active shaft which is configured to be inserted into the first housing, wherein the active shaft is connected to the motor; and
a second housing, being coupled to the first housing and coupled to an idler assembly, wherein the idler assembly and the active shaft are configured to be located coaxially;
wherein the idler assembly includes:
an idler, being disc-shaped and having a hole; and
a coupling member, having a through-groove on an outer circumferential surface of the coupling member and configured to rotatably couple the idler to the second housing, wherein the through-groove is recessed toward a center of the coupling member, and
wherein a cable is configured to be connected to an inside of the second housing through the hole and the through-groove,
wherein the coupling member is configured to be inserted in the hole of the idler and combined with the second housing,
wherein the idler includes:
a disc having a coupling hole and a center hole; and
a locking protrusion being vertically extended at an inner circumferential surface of the disc, and
wherein the coupling member includes:
a cylindrical body having a longitudinally formed hole, being coupled to the second housing, and having the through-groove; and
an anti-separation step being vertically extended from an end of the cylindrical body except for an area where the through-groove is formed.

2. The semi-hollow actuator module of claim 1, wherein the second housing has a moving groove being recessed inward at a position corresponding to the through-groove, and
wherein the cable is configured to be connected to the inside of the second housing through the moving groove.

3. The semi-hollow actuator module of claim 1, wherein a terminal that is configured to be connected with a connector at an end of the cable is disposed at a side surface of the first housing.

4. The semi-hollow actuator module of claim 3, wherein a through-portion is formed at a side surface of the second housing, and
wherein the cable being connected to the terminal is configured to be connected to the inside of the second housing through the through-portion.

5. The semi-hollow actuator module of claim 3, wherein the terminal is disposed on each of both sides of the first housing.

6. The semi-hollow actuator module of claim 3, wherein the second housing includes:
an upper end portion to which the coupling member is coupled;
a lower end portion being formed with the same height as the upper end portion; and
an upper-lower end connecting portion being disposed between the upper end portion and the lower end portion, and being recessed inward.

7. The semi-hollow actuator module of claim 6, wherein the upper end portion has a seat being recessed inward at a position where the idler assembly is seated.

8. The semi-hollow actuator module of claim 6, further comprising a cover being coupled to the upper-lower end connecting portion and having side protrusions configured to prevent from separation of the connector at the end of the cable connected to the terminal.

9. The semi-hollow actuator module of claim 1, wherein the shaft and the idler are coaxially disposed.

* * * * *